No. 834,437. PATENTED OCT. 30, 1906.
E. WOELKE.
BISCUIT CUTTER.
APPLICATION FILED AUG. 15, 1904.

Witnesses.

Inventor
Emil Woelke
by B. Singer atty

UNITED STATES PATENT OFFICE.

EMIL WOELKE, OF HARBURG-ON-THE-ELBE, GERMANY.

BISCUIT-CUTTER.

No. 834,437.  Specification of Letters Patent.  Patented Oct. 30, 1906.

Application filed August 15, 1904. Serial No. 220,818.

*To all whom it may concern:*

Be it known that I, EMIL WOELKE, manufacturer, residing at Neuestrasse 37, Harburg-on-the-Elbe, in the Empire of Germany, have invented new and useful Improvements in Cylindrical Form-Cutters to Cut Out Cakes, Crackers, and Similar Pastry-Ware, of which the following is a specification.

The invention relates to improvements in biscuit-cutters and the like, and is adapted to be applied either to power or manually operated cutters, and has for its object the provision of a cutter capable when applied to a strip or piece of dough of subdividing an area thereof equal to the area of the cutter into completely-formed distinct biscuits or units, thereby avoiding the formation of scraps or incompletely-formed units both at the margins of the cutter and at points intermediate thereof.

To this end the invention consists in the provision of a cutter provided on its working face with a plurality of intersecting cutting-ribs forming intervening cavities of different size and contour throughout the length of the cutter, the fractional or end cavities intersected by the ends of the cutter being provided with marginal cutting-ribs.

The invention is also adapted for cutters designed to subdivide the dough into distinct units of uniform size.

Figure 1:
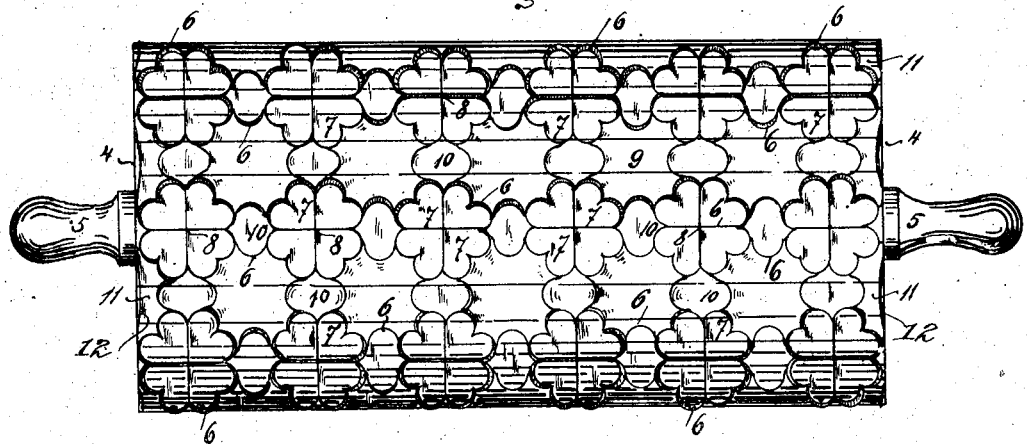
Figure 2:
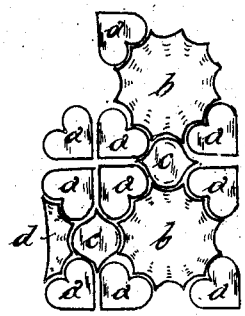

In the drawings, Figure 1 is a side elevation of a rolling-pin having the usual cylindrical working surface and showing the invention applied thereto. Fig. 2 is a view of a plurality of biscuits or dough units formed by said cutters.

The biscuit-cutter shown is cylindrical in form and is embodied in the usual rolling-pin 4, having handles 5, the surface of which is provided with a plurality of sharp cutting ridges or ribs extending completely across its working face. The said ridges or ribs intersect and join in a manner to form a plurality of intervening cavities, each cavity throughout the length of the cutter subdividing the dough into complete units. The arrangement of the cutting-ribs herein shown is designed to form the dough into distinct units of different sizes and contour, the shapes being somewhat fantastic, although the invention is also adapted for cutters designed to form units of uniform size. The cutting-ribs (designated by 6 and 8) form heart-shaped cavities 7 and also oblong pointed cavities 10, all of said cavities being preferably located in alinement. The cutting-ribs 6 also form intermediate cavities 9, producing outwardly-pointed units. At the ends of the cutter where the cavities 9 are intersected and where an incompletely-formed unit would ordinarily be produced I provide fractional cutting-ribs 12 along the margins of the cutter-forming cavities 11. In Fig. 2 is shown a plurality of units or biscuits formed by the cutter from the end margin thereof inwardly. The units $d$ are formed in the cavities 11, the outwardly-pointed units $b$ in the cavities 9, the oblong units $c$ in the cavities 10, and the heart-shaped units $a$ in the cavities 7.

It will be seen from the foregoing that the cutter shown serves throughout its length to subdivide the dough into completely-formed units, entirely avoiding the formation of scraps and the time employed in collecting and preparing the same for a second cutting operation.

I claim—

1. A biscuit-cutter provided with a plurality of intersecting cutting-ribs forming intervening cavities of different size and contour throughout the length of the cutter, the fractional end cavities intersected by the ends of the cutter being provided with marginal cutting-ribs, each cavity throughout the length of said cutter including said end cavities serving to subdivide the dough into distinct and complete units.

2. A cylindrical biscuit-cutter provided with a plurality of intersecting cutting-ribs forming intervening cavities throughout the length of the cutter, the fractional end cavities intersected by the ends of the cutter being provided with marginal cutting-ribs, each cavity throughout the length of said cutter including said end cavities serving to subdivide the dough into distinct and complete units.

In testimony whereof I affix my signature in presence of two witnesses.

EMIL WOELKE.

Witnesses:
 E. H. L. MUMMENHOFF,
 OTTO W. HELLMRICH.